June 12, 1956   E. W. VOLKEL   2,749,614
RIVET SHEARING TOOL
Filed April 29, 1955
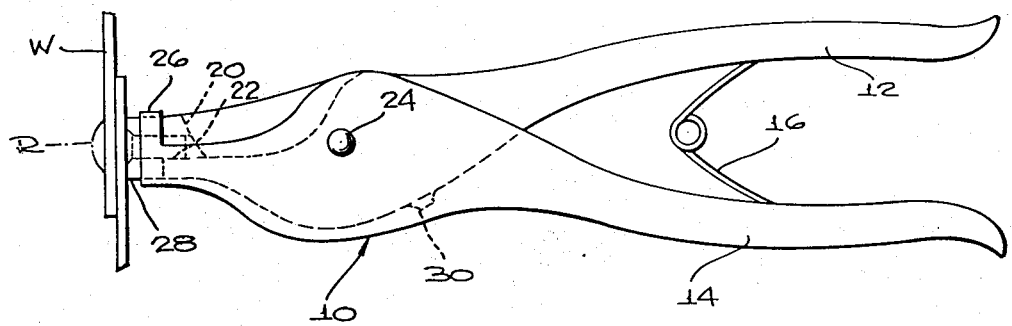
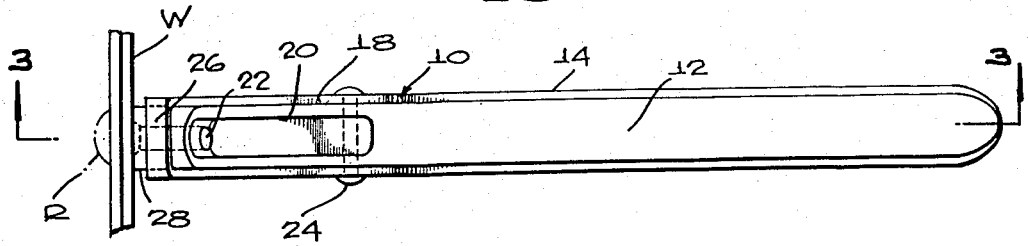
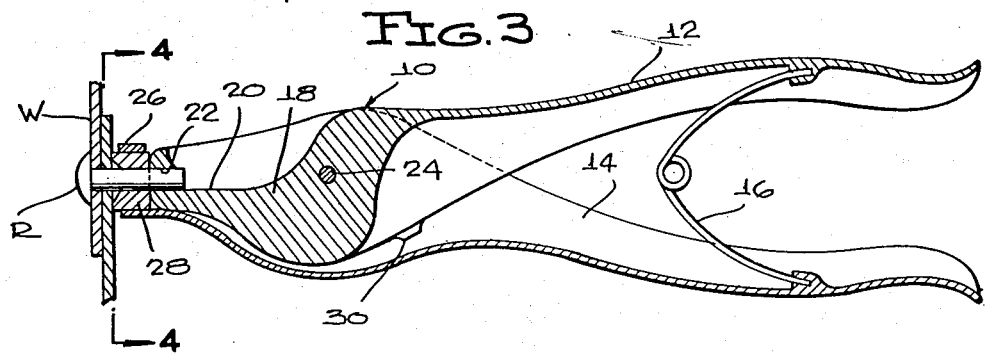
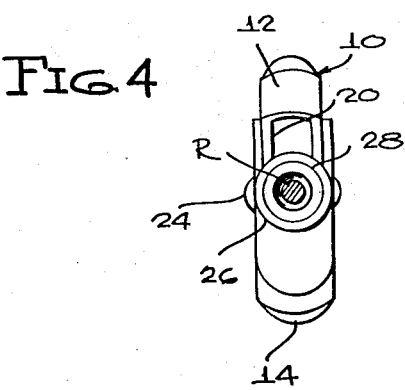
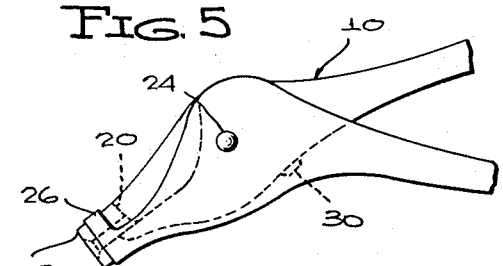
INVENTOR.
ELLIS W. VOLKEL
BY
McMorrow, Berman & Davidson
ATTORNEYS

2,749,614

RIVET SHEARING TOOL

Ellis W. Volkel, Perrysville, Ind.

Application April 29, 1955, Serial No. 504,842

4 Claims. (Cl. 30—250)

This invention relates to a pliers-type cutting tool for shearing off a rivet at a predetermined distance along its length from the surface of the work that is to be riveted.

In certain riveting operations, as for example on aircraft, the rivet shank must extend a predetermined distance, such as one and one-half times its diameter, from the work before being secured permanently thereto.

The trimming of a rivet to the correct length, in accordance with the present invention, is carried out after the rivet is inserted in the holes provided therefor in the work. The invention comprises a tool abutted against the workpiece and receiving the projecting rivet shank, with said tool having a cutting or shear action at an established desired distance from the work surface.

Among objects of importance are the following:

To provide a tool that will be simple, compact, and inexpensive;

To provide an improved cutting action; and

To permit the tool to be operatively disposed for cutting the rivet without requirement of shifting the handles toward or away from each other.

Other objects will appear from the following description, the claims appended thereto, and from the annexed drawing in which like reference characters designate like parts throughout the several views and wherein:

Figure 1 is a side elevational view of my cutting tool applied to a rivet;

Figure 2 is a top plan view;

Figure 3 is a longitudinal sectional view on line 3—3 of Figure 2;

Figure 4 is an end elevational view of the tool as seen from line 4—4 of Figure 3; and Figure 5 is a side elevational view in which the handles are shown fragmentarily.

A pair of handles 12, 14 of channel formation are normally urged apart by a spring 16. At its front end, handle 12 has an enlarged part 18 having a tapering nose the top surface of which has an upwardly opening recess, the nose further having a base communicating between the end of the nose and the recess.

A pivot pin 24 passes through part 18 and also through the side walls of handle 14 to pivotally connect the handles. Integral with and extending between the side walls of handle 14, forwardly of the nose, is a bridge or yoke 26 extending transversely between the walls for engagement over a shear head 28 carried by the handle 14. The head 28 is axially bored and its bore is flared to facilitate insertion of a rivet R therein. When the handles are in their normal spread relation, the bores of the head and nose are coaxial for extension of the rivet shank fully therethrough.

Limiting movement of the handles toward each other is a stop 30.

In use, the rivet R is extended through the work W. The tool is applied with head 26 abutting against the work and this will dispose the cutting or shear line of the tool, which is in the plane of the contacting faces of the shear head 28 and the nose of part 18, an exact, predetermined distance from the work surface, along the length of the rivet. The rivet, which extends through the registering bores of the head and nose, will thus be cut at the exact point along its length that represents the distance its shank is to extend outwardly from the work. Thus, in the illustrated example, the rivet is to be cut at a distance from the work equal to one and one-half times the rivet diameter. The length of the shear head will represent this distance. In a commercial embodiment, the head could be removable, so that heads of different lengths and/or bore sizes could be used interchangeably. Alternatively, each tool would be made for shearing a rivet of a particular size.

The recess 20 constitutes an ejection recess, into which the cut off rivet piece will drop.

It is believed apparent that the invention is not necessarily confined to the specific use or uses thereof described above since it may be utilized for any purpose to which it may be suited. Nor is the invention to be necessarily limited to the specific construction illustrated and described since such construction is only intended to be illustrative of the principles, it being considered that the invention comprehends any minor change in construction that may be permitted within the scope of the appended claims.

What is claimed is:

1. A pliers-type rivet cutting tool comprising a pair of pivotally connected handles; a nose on one handle having a bore; a shear head on the other handle having a bore registering with the first bore in one position of the handles to receive a rivet and shear the same between the head and nose on relative shifting of the handles about their pivot axis.

2. A pliers-type cutting tool comprising a pair of pivotally connected handles; one of said handles having a tapered nose and the other being channeled to define side walls between which said nose is confined, said nose having a bore; and a shear head carried by said other handle between the side walls and formed with a bore registering with the first bore in one position of the handles, said bores being adapted to receive a rivet to be sheared between the head and nose.

3. A pliers-type cutting tool comprising a pair of pivotally connected handles; one of said handles having a tapered nose and the other being channeled to define side walls between which said nose is confined, said nose having a bore; and a shear head carried by said other handle between the side walls and formed with a bore registering with the first bore in one position of the handles, said bores being adapted to receive a rivet to be sheared between the head and nose, the nose having a recess communicating with said bore to receive the sheared-off part of the rivet.

4. A pliers-type cutting tool comprising a pair of pivotally connected handles; one of said handles having a tapered nose and the other being channeled to define side walls between which said nose is confined, said nose having a bore; and a shear head carried by said other handle between the side walls and formed with a bore registering with the first bore in one position of the handles, said bores being adapted to receive a rivet to be sheared between the head and nose, said other handle including a transverse bridging element extending between said side walls to cooperate with the side walls in forming a yoke in which the head is engaged.

No references cited.